(12) United States Patent
Valembois

(10) Patent No.: US 12,305,704 B2
(45) Date of Patent: May 20, 2025

(54) METHOD FOR MANUFACTURING BY MOLDING ELONGATE AND HOLLOW WORKPIECES MADE FROM COMPOSITE MATERIAL, MOLDING DEVICE FOR IMPLEMENTING THE METHOD AND WORKPIECES OBTAINED

(71) Applicant: CONSEIL ET TECHNIQUE, Sainte Foy d'Aigrefeuille (FR)

(72) Inventor: Guy Valembois, Lauzerville (FR)

(73) Assignee: NEXTEAM, Marmande (FR)

( * ) Notice: Subject to any disclaimer, the term of this patent is extended or adjusted under 35 U.S.C. 154(b) by 286 days.

(21) Appl. No.: 17/997,479

(22) PCT Filed: Apr. 26, 2021

(86) PCT No.: PCT/EP2021/060782
§ 371 (c)(1),
(2) Date: Oct. 28, 2022

(87) PCT Pub. No.: WO2021/219526
PCT Pub. Date: Nov. 4, 2021

(65) Prior Publication Data
US 2023/0175547 A1    Jun. 8, 2023

(30) Foreign Application Priority Data

Apr. 30, 2020    (FR) ........................................ 2004290

(51) Int. Cl.
*F16C 3/02*      (2006.01)
*B29C 33/40*    (2006.01)
(Continued)

(52) U.S. Cl.
CPC ............ *F16C 3/026* (2013.01); *B29C 33/405* (2013.01); *B29C 53/581* (2013.01);
(Continued)

(58) Field of Classification Search
CPC ...... F16C 3/026; F16C 7/026; F16C 2326/06; B29C 33/405; B29C 53/581;
(Continued)

(56) References Cited

FOREIGN PATENT DOCUMENTS

FR      2550123 A1      2/1985
FR      2589962 A1 *    5/1987
(Continued)

*Primary Examiner* — Jacob M Amick
*Assistant Examiner* — Charles J Brauch
(74) *Attorney, Agent, or Firm* — Craft Chu PLLC; Andrew W. Chu

(57) ABSTRACT

The method includes producing an initial preform on a mandrel by filament winding without generating shrinking, cutting the initial preform to the correct length, placing the assembly provided beforehand with internal drainage device and pressurization device into a female mold, and bringing the preform assembly to a softening temperature and pressurizing the assembly at both ends until it is deformed by a diametrical increase in its dimensions. The method further includes bringing the impregnation resin to polymerization temperature and pressure in order to allow the workpiece to consolidate, its external shape becoming consistent with the internal shape of the mold, opening the mold and removing the workpiece from the mold, and machining the final shapes of the composite workpiece.

7 Claims, 5 Drawing Sheets

(51) Int. Cl.
- *B29C 53/58* (2006.01)
- *B29C 70/44* (2006.01)
- *B29C 70/68* (2006.01)
- *B29D 99/00* (2010.01)
- *B29L 23/00* (2006.01)
- *B29L 31/00* (2006.01)
- *F16C 7/02* (2006.01)

(52) U.S. Cl.
CPC .......... *B29C 53/585* (2013.01); *B29C 70/446* (2013.01); *B29C 70/68* (2013.01); *B29D 99/0003* (2013.01); *F16C 7/026* (2013.01); *B29L 2023/00* (2013.01); *B29L 2031/75* (2013.01); *F16C 2326/06* (2013.01)

(58) Field of Classification Search
CPC ..... B29C 53/585; B29C 70/446; B29C 70/68; B29D 99/0003; B29L 2023/00; B29L 2031/75

See application file for complete search history.

(56) References Cited

FOREIGN PATENT DOCUMENTS

| | | | |
|---|---|---|---|
| FR | 2970533 A1 | 7/2012 | |
| WO | WO-2005105417 A1 * | 11/2005 | ........... B29C 70/446 |

* cited by examiner

[Fig.1]
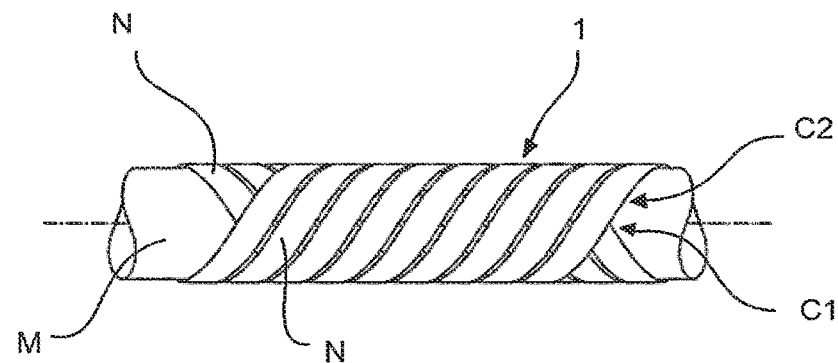
[Fig.2]
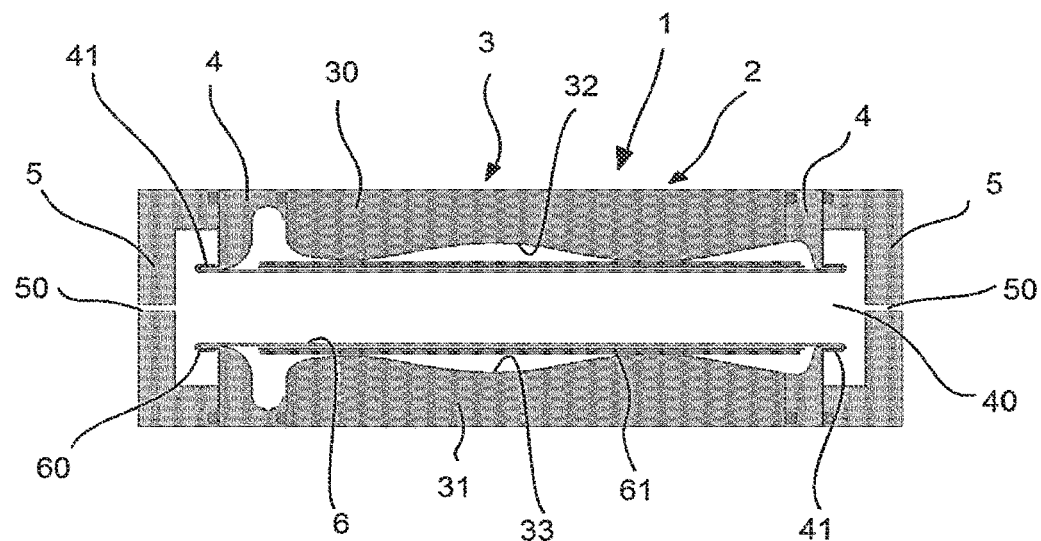
[Fig.3]
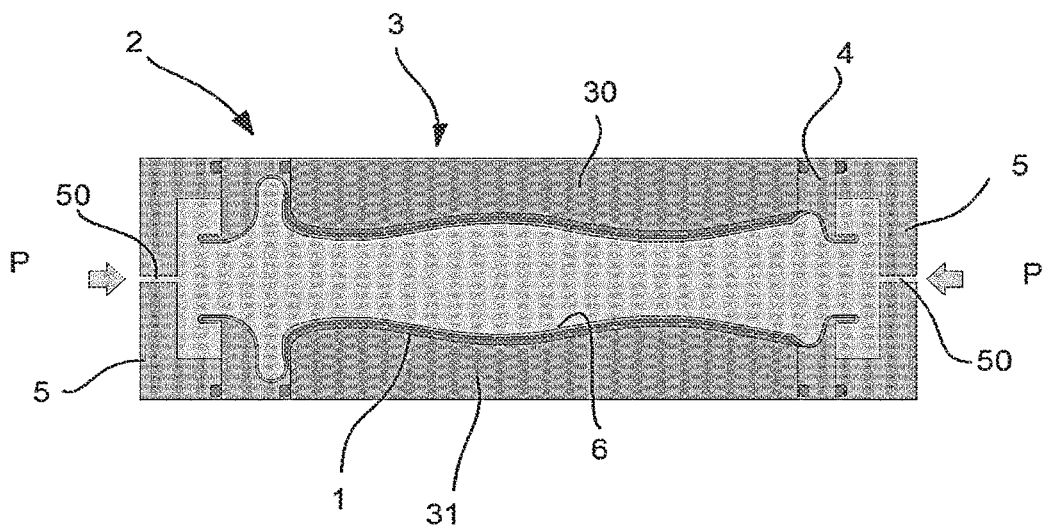

[Fig.4]
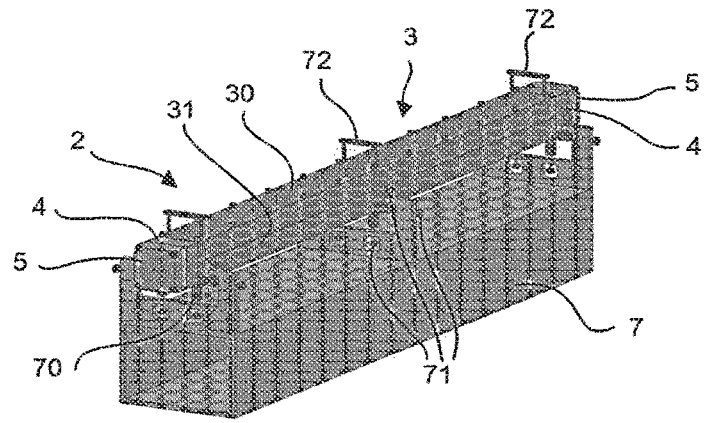
[Fig.5]
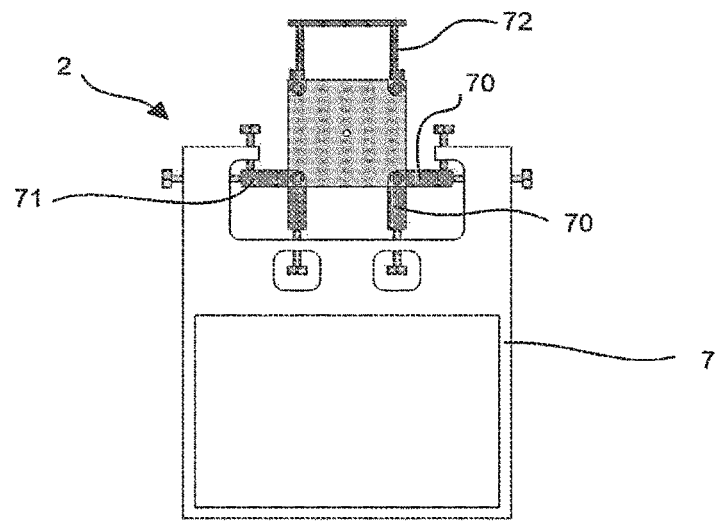
[Fig.6]
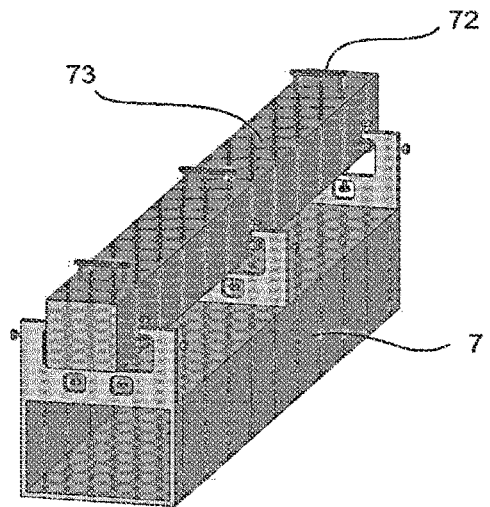

[Fig.7]
[Fig.8]
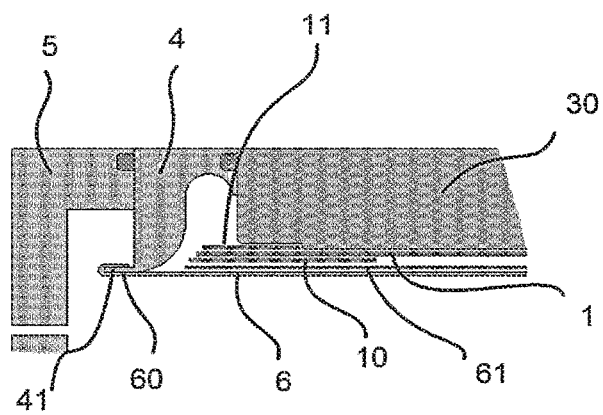
[Fig.9]
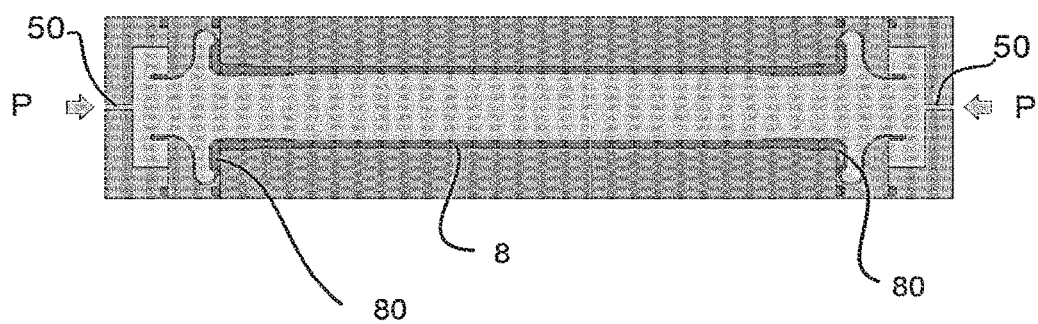
[Fig.10]
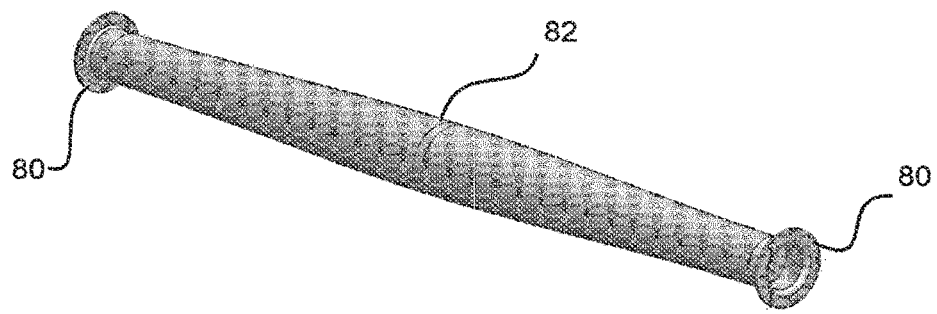

[Fig.11]
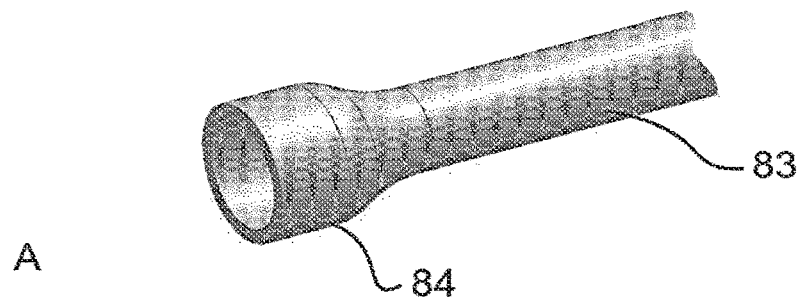
A
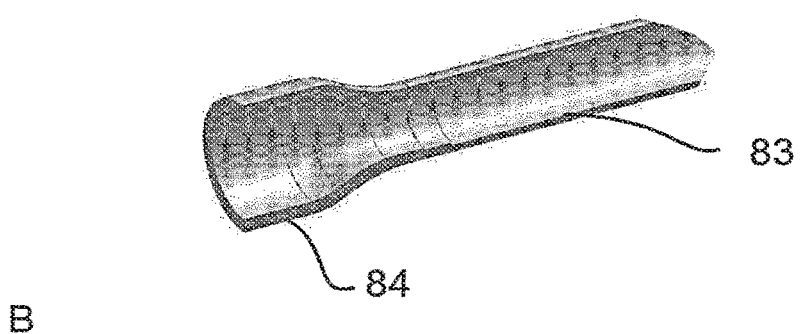
B
[Fig.12]
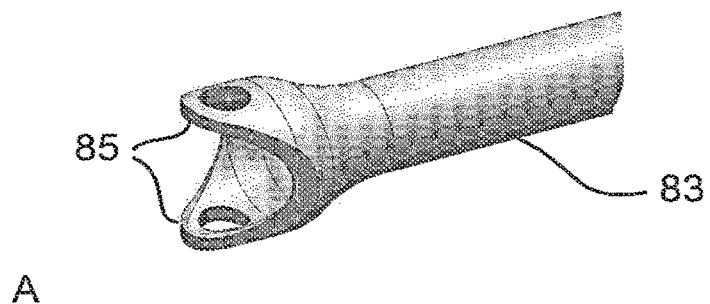
A
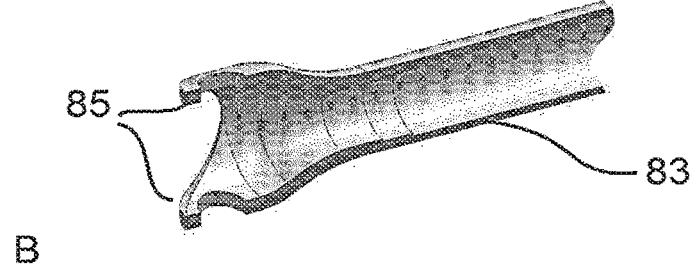
B

[Fig.13]
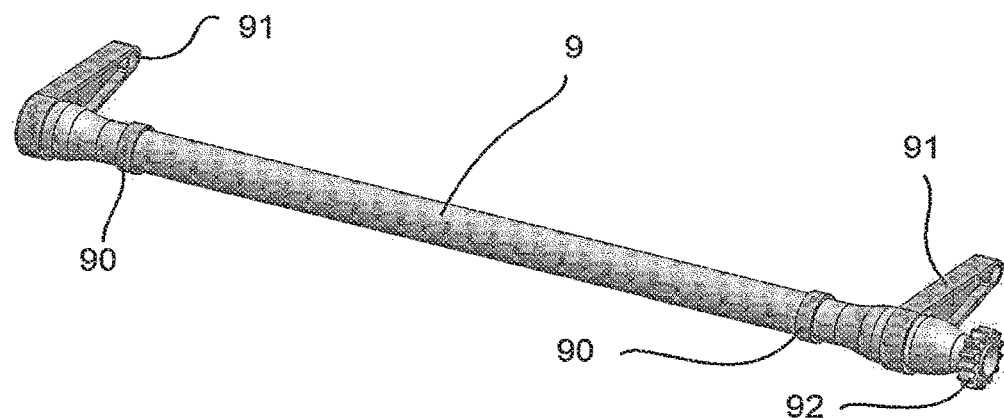
[Fig.14]
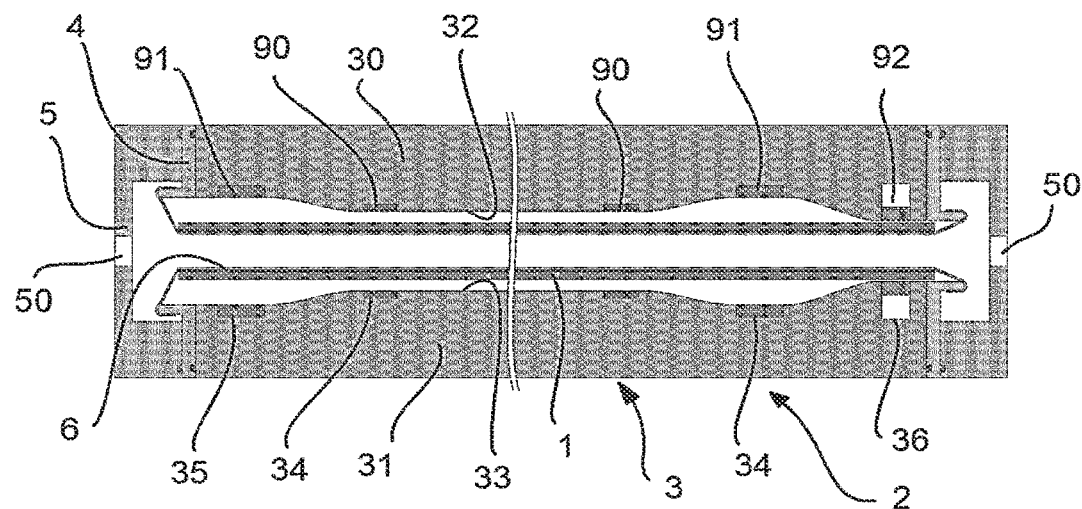
[Fig.15]
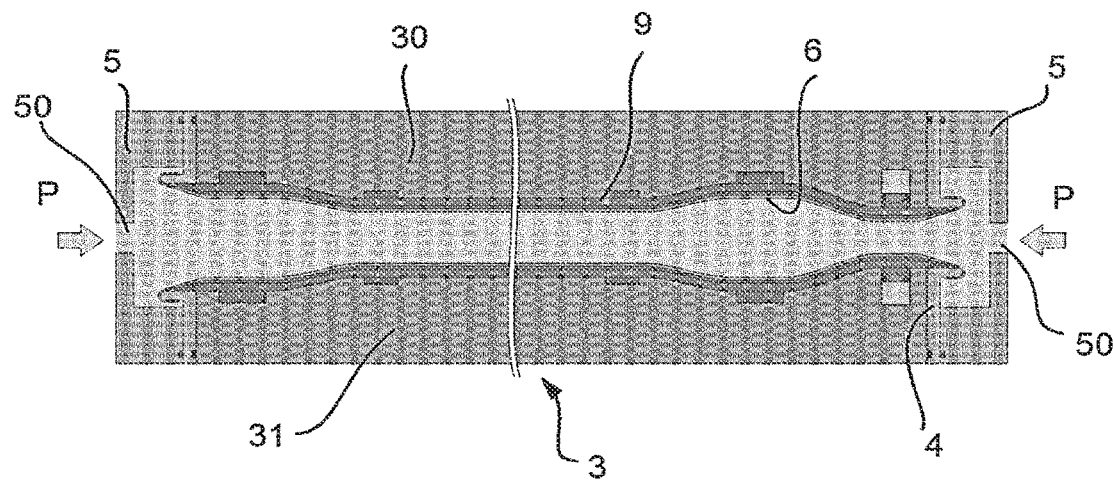

METHOD FOR MANUFACTURING BY MOLDING ELONGATE AND HOLLOW WORKPIECES MADE FROM COMPOSITE MATERIAL, MOLDING DEVICE FOR IMPLEMENTING THE METHOD AND WORKPIECES OBTAINED

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of elongate and hollow workpieces made from composite material, and more particularly long workpieces, such as, without limitation, transmission shafts, connecting rods, cardan shafts, and it relates to a method of manufacturing these workpieces by molding, as well as the molding device making it possible to implement said method.

2. Description of Related Art Including Information Disclosed Under 37 CFR 1.97 and 37 CFR 1.98

Such composite structures are essentially produced by creating a tube by filament winding onto which metal appendages or inserts are attached, in particular at the ends, that are intended for producing an interface with another element.

Such hybrid workpieces, composed of a tube equipped with metal ends, are described in numerous documents, for example document FR 2970533, where the maintenance of a metal element is obtained by filament winding around radial pins secured to said metallic element. Besides the fact that such a technique is not optimal for maintaining elements and inserts, it is above all the tubular part itself that remains the weak point of these hybrid workpieces.

Indeed, the manufacture of composite tubes is generally carried out by conventional filament winding, that is to say, consisting in depositing pre-impregnated reinforcing fibers on a mandrel moved in rotation about its axis, the deposit being carried out by at least one wire-carrying carriage movable along said mandrel. The movement speed of the robot and the rotation speed of the mandrel define the deposit angle. The placement of the fibers by alternating and longitudinal sweeping of the carriage arranges the fibers in a helical manner on the rotating mandrel, with crossing of the fibers on each sweep.

However, it is known that the length of a finished fabric is always less than the length of the warp because the crossing of the warp threads with the weft consumes length. This difference consists in shrinking. Thus, the warp threads undulate between the weft threads, and therefore do not have any straightness, which reduces the strength and rigidity of the manufactured workpiece.

Shrinking is therefore an important element to take into account when designing a composite workpiece. In the case of the manufacture of a tube by winding fibers or plies of fibers, the crossing of the helicoids induces shrinking of the fibers, which generates a limitation in the final performance of the tube thus formed.

Conventional filament winding leads to a crossing of the fiber drawing, inducing shrinking of the preform thus produced. This shrinking leads to a loss of performance of the tube made using this type of preform.

Shrinking is not, however, the only disadvantage of the conventional winding technique.

Another disadvantage consists in the fact that the filament winding of the preform necessarily takes place with an expansion of the fiber drawing. This expansion leads to having an outer diameter of the preform that is greater than the outer diameter of the final workpiece. In order to have a correct fiber volume ratio, it is necessary to neutralize this expansion by tightening the outer surface of the tube during polymerization, which leads to a reduction in the outer diameter necessarily causing pleating of the fibers. Good clamping under external pressure is therefore incompatible with good local straightness of the fiber drawing, which limits the performance of the material constituting the tube.

Another disadvantage of this technique appears when making very long workpieces; it is not possible to hold the mandrel equipped with its preform in a horizontal position without having a deflection due to gravity, and polymerization in this position therefore induces a lack of straightness of these long shafts made in this way. An alternative is to position the mandrel provided with its preform in a vertical position, which complicates the feasibility in particular for very long workpieces.

Conversely, producing a workpiece wound on a mandrel limits the shapes of the workpiece due to the need to remove the mandrel from the mold.

Finally, producing a transmission shaft requires the addition of end pieces via fixing systems that can be expensive, heavy or delicate in terms of justification or certification.

A molding method is also known that consists in deploying, under pressure, a bladder disposed inside a preform made of composite material. The bladder externally has the shape, in reduced dimensions, of the molding cavity; its swelling inside the preform externally gives it the shape of said cavity.

Such a method is described in document WO2005/105417. It will, however, be noted that the method described therein is not suitable for molding long objects, as it is difficult to control the shape and positioning of the bladder over a great length.

This method therefore does not make it possible to solve all the problems mentioned above, in particular as regards the great length.

It will also be noted that a method is also known that makes it possible to reinforce a cylindrical workpiece by winding pairs of layers of filamentary element helically around it under a predetermined tension and reversing the direction of the winding after each layer. This method, described in document FR 2 589 962, does not make it possible to produce a preform intended to be molded by expansion.

BRIEF SUMMARY OF THE INVENTION

The present invention aims to remedy the various technical problems mentioned above, in order to allow the production of a hollow and long composite workpiece, having remarkable geometric precision, particularly its straightness, which can be of non-removable internal shape, having an excellent fiber volume ratio while avoiding pleating of the fibers, allowing the manufacture in the same phase of the particular shapes embodying the ends of the workpiece.

The present invention consists of a method for producing a composite workpiece of tubular shape, which is characterized in that it comprises the following successive steps:
  producing an initial preform on a circular or ovoid mandrel without creating shrinking, that is to say, by superimposing several distinct layers, each layer being entirely made up either of a winding of fibers arranged in helicoids that are all parallel, or from the rolling of one or more plies of pre-impregnated unidirectional fibers correctly oriented in a helicoidal manner, while the helicoids of one layer have the opposite helix angle with respect to that of the helicoids of the adjacent layer(s),
  cutting said initial preform to the correct length,
  placing the assembly in a female mold previously equipped with internal drainage means and pressurizing means,
  bringing the impregnation resin to a softening temperature and pressurizing the preform assembly at both ends until it is deformed by a diametrical increase in its dimensions, until it matches the female shape of the mold,
  bringing the impregnation resin to polymerization temperature and pressure in order to allow the workpiece to consolidate, its external shape becoming consistent with the internal shape of the mold,
  opening the mold and removing the workpiece from the mold,
  machining the final shapes of the composite workpiece.

Pressurization makes it possible to tension the fibers arranged in helicoids, which tension is maintained during polymerization.

According to an additional feature of the method according to the invention, after the step of cutting the initial preform to the correct length and before placing it in the mold, several intermediate steps are carried out successively, namely:
  producing one or more secondary preforms on a circular or ovoid mandrel, adapted so as to be able to be arranged around and/or inside the initial preform
  cutting said secondary preforms to suitable lengths,
  assembling said secondary preforms on and/or in said initial preform.

According to an additional feature of the method according to the invention, before the step of placing the initial preform in the mold, one or more ancillary workpieces are placed in the mold having an axial central opening, into which said initial preform is introduced.

In order to be able to implement the method according to the invention, it was necessary to design a new molding device, which is characterized in that it comprises:
  a body made up of at least two longitudinally separable parts, allowing it to be opened after polymerization and allowing the molding of the molded workpiece, and having the shape to be molded hollow inside,
  a tubular membrane capable of being introduced inside the initial preform,
  two sleeves, each arranged at one end of said body, having a central opening allowing the passage of said membrane, and each comprising means for retaining the edge of one end of said tubular membrane in a sealed manner,
  two end stoppers, closing said sleeves, and suitable for sealing, and each equipped with means of connection to external means for pressurizing the interior of said tubular membrane.

According to an additional feature of the molding device according to the invention, the means for sealingly retaining the edge of one end of the tubular membrane consist of an axial annular lip extending on the periphery of the orifice of the central opening, and on the outer side and on which the end edge of the membrane is folded.

According to another additional feature of the molding device according to the invention, the mold is associated with a rigid frame that supports it through insulating spacers, and along its length it comprises geometric control targets making it possible to detect a possible fault in straightness, while said spacers cooperate with adjustment elements capable of correcting said fault.

In practice, the preform is placed in the at least two longitudinally separable parts of the mold, which is then closed. Preferably, drainage accessories such as microperforated fabric and felt will have been interposed beforehand between the preform and the membrane.

The sleeves are then attached in a leaktight manner each to one of the ends of the at least two separable parts assembled longitudinally, and each of the ends of the membrane is fixed to a sleeve, then the stoppers close the ends of the mold thus formed.

The method according to the invention offers new possibilities for producing transmission shafts made from composite material. Thus, without limitation, it is possible to envisage shafts comprising a fastening flange at least at one of their ends, or else comprising a shape adapted to cooperate with the spider of a cardan joint at least at one of their ends, or else comprising additional workpieces, namely one or more bearing rings and/or one or more levers and/or one or more pinions, and which have different internal diameters.

BRIEF DESCRIPTION OF THE SEVERAL VIEWS OF THE DRAWINGS

The advantages and features of the method and the molding device according to the invention will emerge more clearly from the description which follows and which relates to the appended drawing, which represents one non-limiting embodiment thereof.

In the appended drawing:
FIG. 1 shows a partial schematic view illustrating a step of the method according to the invention.

FIG. 2 shows a schematic sectional view according to a longitudinal plane of a mold according to the invention, during another step of the method according to the invention.

FIG. 3 shows the same schematic sectional view of a mold according to the invention, during another step of the method according to the invention.

FIG. 4 shows a perspective view of the molding device according to the invention.

FIG. 5 shows a cross-sectional diagram of the same molding device.

FIG. 6 shows a perspective view of a variant of the same molding device.

FIG. 7 shows a perspective view of an elongated tubular workpiece capable of being obtained by the method and in the molding device according to the invention.

FIG. 8 shows a sectional view in a longitudinal plane of part of the molding device according to the invention, during a step of the method for manufacturing the workpiece of FIG. 7.

FIG. 9 shows a view of the molding device according to the invention, during another step of the method for manufacturing the workpiece of FIG. 8.

FIG. 10 shows a perspective view of a variant of the elongated tubular workpiece capable of being obtained by the method and in the molding device according to the invention.

FIG. 11A shows a perspective view of the end of a tubular workpiece obtained by the method and in the molding device according to the invention.

FIG. 11B shows a perspective and sectional view of the same end.

FIG. 12A shows a perspective view of the end of a cardan joint obtained after machining the workpiece of FIG. 11.

FIG. 12B shows a perspective and sectional view of the same cardan end.

FIG. 13 shows a perspective view of a complex workpiece obtained by the method and in the molding device according to the invention.

FIG. 14 shows a schematic sectional view along a longitudinal plane of a mold according to the invention, during a step of the method for manufacturing the complex part of FIG. 13.

FIG. 15 shows the same schematic view, during another step in the manufacturing method for the complex workpiece of FIG. 13.

DETAILED DESCRIPTION OF THE INVENTION

Referring to FIG. 1, we can see the first step of the method for producing a composite workpiece of tubular shape according to the invention, namely the production of a preform 1, obtained by filament winding on a mandrel M.

According to the method, it is necessary to overcome the problem of shrinking, which is obtained by superimposing several distinct layers, each layer being entirely constituted either by a winding of fibers arranged in helical shapes and that are all parallel, or by plies of pre-impregnated unidirectional fibers.

In this case in FIG. 1, the preform 1 comprises two layers C1 and C2 of plies N of pre-impregnated unidirectional fibers, deposited in helicoids, all parallel in the same layer, and with one layer in the opposite direction with respect to the other. There is thus no interlacing of plies N in the same layer, and therefore no shrinking.

Referring now to FIG. 2, a mold 2 according to the invention can be seen, making it possible to implement the method according to the invention.

This mold 2 comes from the assembly of several elements, including in this case a main body 3, two sleeves 4, two stoppers 5, and a tubular membrane 6.

The main body 3 is divided longitudinally into, without limitation, two parts 30 and 31, comprising a cavity on the inside, respectively 32 and 33, making it possible to reconstitute the hollow shape to be molded.

The two sleeves 4 are intended to be joined in a sealed manner, each at one end of the main body; they are annular in shape and comprise, at their central opening 40, means 41 for hooking an end edge 60 of the tubular membrane 6.

In the embodiment shown, each of the sleeves 4 on the outer side at the periphery of the orifice of the opening 40, an annular lip 41 on which the end edge 60 of the membrane 6 can be turned over so as to achieve the sealing, locking means, not shown, ensuring the maintenance.

The stoppers 5 are intended to be secured in a sealed manner each to a sleeve 4, and they are pierced with a hole 50 allowing pressurization of the mold 2.

The membrane 6 is made of a material of the elastomer type with a high deformation capacity and adapted to the polymerization temperature used.

According to the method, after straightening of the length of the preform 1, the tubular membrane 6 is introduced therein axially, preferably after having inserted drainage elements 61 such as micro-perforated fabric and felt. Then, the assembly is placed between the parts 30 and 31 of the body 3, which is then closed, the sleeves 4 are fixed to the body 3, the end edges 60 of the membrane are secured there and the stoppers 5 close the mold 2.

As can be seen in FIG. 3, the mold 2 is brought to the softening temperature of the impregnation resin under pressure P, at both ends so that this pressure is well balanced, which causes the membrane 6 to swell and the preform 1 to be deformed, the latter coming into contact with the cavities 32 and 33. Then an increase in temperature and pressure according to the conditions recommended for the polymerization of the resin leads to the consolidation of the composite workpiece.

Referring now to FIGS. 4, 5 and 6, one can see the external characteristics of the mold 2, which are necessary to respect the geometry of the workpiece to be manufactured when the latter is very long.

It is known that the geometry of the workpiece is dependent on the geometry of the mandrel, which is difficult to control in the case of great lengths; the latter being slender, it is necessarily flexible. It therefore undergoes the effects of gravity as well as the stresses generated by the relative thermal expansions between the composite workpiece and the mandrel.

The molding device according to the invention allows the production of hollow workpieces with shaping of the external shape of the workpieces to the internal shape of the mold. This particularity allows the geometry of the workpiece to be controlled during its polymerization phase.

As can be seen in these figures, the mold 2 is supported by a rigid frame 7, by means of insulating spacers 70, for example, without limitation, made from titanium alloy or ceramic, which cooperate with adjustment elements 71 linked to the frame 7, while geometric control targets 72 are secured to the mold 2.

As can be seen in FIG. 6, the mold is wrapped in a thermal insulator 73, while leaving the geometric targets 72 and the adjustment elements 71 accessible.

In practice, the mold 2 incorporates heating resistors and thermocouples that provide thermal management, while the pressurization is carried out by compressed gas.

Under the action of gravity and during the pressurization and bringing to temperature phases, the mold 2 deforms. The external measurement of the position of the targets then makes it possible to carry out a continuous readjustment of the overall straightness of the mold 2 by acting on adjustment elements 71.

It will be noted that the means for measuring the geometry of the mold can be of any nature: mechanical, optical, by Hall effect, etc.

The adjustment elements 71 can be directly actuated by operators during the polymerization, or by any type of position servo-control allowing the realignment of the mold 2.

Referring now to FIGS. 7, 8 and 9, one can see a variant of the method according to the invention, and in particular in FIG. 7, a shaft 8 provided at each of its ends with a flange 80, and in FIGS. 8 and 9, the molding operation making it possible to obtain these flanges 80.

These shafts with flanges are of great interest because they make it possible not to use connecting metal parts, the connection of which with the composite workpiece is always tricky.

Thus, in FIG. 8, it can be seen that to produce a flange 80, the initial preform 1 is associated with two secondary preforms 10 and 11, which are in the form of tube segments, one 10 engaged inside of the initial preform 1, and the other 11 arranged around the initial preform 1, so as to frame the end part of the initial preform 1.

The stack of secondary preforms 10 and 11, inside or around the initial preform 1, allows a local increase in thickness that, in association with inclination choices of the fiber drawing of the secondary preforms 10 and 11, allows the resistance of the flanges 80 to be optimized.

Conversely, the length of the initial preform 1, and the location of the stack of secondary preforms 10 and 11, is in line with the cavity of the mold 2, so that this stack partially overflows the tubular part of this cavity, and so that the membrane 6, under the effect of the pressure, pushes the preform outwards to form the flange 80. To this end, the mold 2 has a suitable cavity, namely clearances between the body 3 and the sleeves 4, allowing a judicious distribution of the increase in thickness toward the outside as well as the inside in order to optimize the resistance of the end thus formed.

FIG. 10 shows another advantage of the present invention, namely to allow an increase in the central dimensions of a transmission shaft 82, in order to increase its torsion and especially bending rigidity, which makes it possible to significantly increase its critical rotation speed.

FIGS. 11A, 11B, 12A and 12B show the possibility, through the method according to the invention, of easily producing a transmission shaft 83, the end of which has a shape suitable for cooperation with the spider of a cardan joint.

As for the production of a flange seen previously, a stack of secondary preforms inside and/or around the end part of the initial preform allows a local increase in thickness.

It will be noted that the choice of the inclinations of the fiber drawing of the secondary preforms makes it possible to optimize the resistance of the ends.

The pressurization of the membrane, associated with an increase in the softening temperature of the resin, as well as the internal shape of the mold, allows the enlargement of the end 84 without a reduction in the thickness of the wall, as can be seen in FIGS. 12A and 12B.

After polymerization, the machining of the end 85 thus obtained allows the fork 85 to be produced that is necessary to actualize the part of the cardan joint.

It will be noted that according to the same approach, the method makes it possible to produce workpiece end shapes, conforming to yokes, thus allowing the production of connecting rods.

The present invention makes it possible to use the deformation capacity of the preform in the mold to produce composite parts that are generally long in shape and more or less of revolution, cooperating with ancillary workpieces.

FIG. 13 non-limitingly shows a shaft 9 made using the method according to the invention, having the particularity of having rolling rings 90, levers 91 and a pinion 92, which have different internal diameters.

FIGS. 14 and 15 show the mold 2 allowing the production of the shaft 9, and whose cavities 32 and 33 are suitable for receiving the rolling rings 90, the levers 91 and the pinion 92, and which for this purpose comprise recesses 34, 35 and 36, respectively.

In practice, the rolling rings 90, the levers 91 and the pinion 92 are placed in the part 31 of the body 3, then the initial preform with any secondary preforms is threaded inside the rolling rings 90, the levers 91 and the pinion 92, and the part 30 of the body 3 is placed above.

It should be noted that the ancillary workpieces may have internal shapes likely to favor their assembly to the composite part, namely:

shapes of revolution having a sufficiently large roughness to create micro-obstacles opposing the sliding of the composite fibers that will be included there during the pressurization, followed by the polymerization phase, non-revolutionary shapes making it possible to oppose any relative movement between the ancillary workpieces and the composite part.

I claim:

1. A transmission shaft, being comprised of composite material, the shaft comprising:

ancillary workpieces, each ancillary workpiece being comprised of at least one of a group consisting of: a bearing ring, a lever, and a pinion, the ancillary workpieces being of different internal diameters, wherein the shaft is obtained by the method comprising the steps of:

producing an initial preform on a circular or ovoid mandrel without creating shrinking, by superimposing several distinct layers, each layer being entirely made up either of a winding of fibers arranged in helicoids that are all parallel, or from the rolling of one or more plies of pre-impregnated unidirectional fibers correctly oriented in a helicoidal manner, while the helicoids of one layer have the opposite helix angle with respect to that of the helicoids of the adjacent layer, cutting said initial preform to the correct length so as to form a preform assembly, placing the preform assembly in a female mold previously equipped with internal drainage means and pressurizing means, bringing an impregnation resin to a softening temperature and pressurizing the preform assembly at both ends until the preform assembly is deformed by a diametrical increase in dimensions, until the preform assembly matches a female shape of the female mold, bringing the impregnation resin to polymerization temperature and pressure in order to allow each ancillary workpiece to consolidate, each ancillary workpiece having an external shape becoming consistent with an internal shape of the female mold, opening the female mold and removing each ancillary workpiece from the female mold, machining final shapes of the ancillary workpieces, and placing, before the step of placing the initial preform in the mold, at least one ancillary workpiece in the mold having an axial central opening, into which said initial preform is introduced.

2. The transmission shaft, according to claim 1, wherein the method, after the step of cutting the initial preform to the correct length, further comprises the steps of:

producing one or more secondary preforms on a circular or ovoid mandrel, adapted so as to be able to be arranged around and/or inside the initial preform, cutting said secondary preforms to suitable lengths, and assembling said secondary preforms on and/or in said initial preform.

3. A molding device, comprising:

a body comprised of at least two longitudinally separable parts, allowing the body to be opened after polymerization and allowing the molding of the shaft, according to claim 1, and having the shape to be molded hollow inside, a tubular membrane capable of being introduced inside the initial preform, two sleeves, each sleeve arranged at one end of said body, having a central opening allowing the passage of said membrane, and each comprising means for retaining the edge of one end of said tubular membrane in a sealed manner, and two end stoppers, closing said sleeves, and suitable for sealing, and each equipped with means of connection to external means for pressurizing the interior of said tubular membrane.

4. The molding device, according to claim 3, wherein the means for sealingly retaining the edge of one end of the tubular membrane is comprised of an axial annular lip extending on the periphery of the orifice of the central opening, and on the outer side and on which the end edge of the membrane is folded.

5. The molding device, according to claim 3, further comprising: a rigid frame being supported through insulating spacers, and being comprised of geometric control targets along a length of the rigid frame so as to detect a possible fault in straightness, while said spacers cooperate with adjustment elements capable of correcting said fault.

6. The transmission shaft, according to claim 1, further comprising:

a securing flange at least at one end of the shaft.

7. The transmission shaft, according to claim 1, having a shape with at least one end suitable for cooperation with a spider of a cardan joint.

* * * * *